(12) United States Patent
Wang

(10) Patent No.: US 11,978,902 B2
(45) Date of Patent: May 7, 2024

(54) ANODE AND METHOD FOR PREPARING THE SAME

(71) Applicant: NINGDE AMPEREX TECHNOLOGY LIMITED, Ningde (CN)

(72) Inventor: Kefei Wang, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 768 days.

(21) Appl. No.: 17/055,335

(22) PCT Filed: Dec. 25, 2019

(86) PCT No.: PCT/CN2019/128441
§ 371 (c)(1),
(2) Date: Nov. 13, 2020

(87) PCT Pub. No.: WO2021/128091
PCT Pub. Date: Jul. 1, 2021

(65) Prior Publication Data
US 2021/0367240 A1    Nov. 25, 2021

(51) Int. Cl.
*H01M 4/62* (2006.01)
*H01M 4/04* (2006.01)
*H01M 4/133* (2010.01)
*H01M 4/1393* (2010.01)
*H01M 4/587* (2010.01)
*H01M 4/02* (2006.01)

(52) U.S. Cl.
CPC .......... *H01M 4/62* (2013.01); *H01M 4/0404* (2013.01); *H01M 4/0471* (2013.01); *H01M 4/133* (2013.01); *H01M 4/1393* (2013.01); *H01M 4/587* (2013.01); *H01M 2004/027* (2013.01)

(58) Field of Classification Search
None
See application file for complete search history.

(56) References Cited

FOREIGN PATENT DOCUMENTS

| | | | |
|---|---|---|---|
| CN | 103779572 | A | 5/2014 |
| CN | 103943818 | A | 7/2014 |
| CN | 106531963 | A | 3/2017 |
| CN | 106848202 | A | 6/2017 |
| CN | 108630898 | A | 10/2018 |
| CN | 108808005 | A | 11/2018 |
| CN | 109037676 | A | 12/2018 |
| CN | 109980225 | A | 7/2019 |
| JP | 2003197030 | A | 7/2003 |
| JP | 2015523699 | A | 8/2015 |
| JP | 6152177 | B1 | 6/2017 |
| JP | 2019535110 | A | 12/2019 |

(Continued)

OTHER PUBLICATIONS

Machine Translation of Chinese Patent Publication No. 106848202 (Year: 2017).*

(Continued)

*Primary Examiner* — Wyatt P McConnell
(74) *Attorney, Agent, or Firm* — XSENSUS LLP

(57) ABSTRACT

A method for preparing an anode, including the step of adding an auxiliary agent with Si—C and Si—O bonds. The method for preparing the anode can reduce defects on a surface of the anode to produce a high-quality anode.

21 Claims, 2 Drawing Sheets

(56) References Cited

FOREIGN PATENT DOCUMENTS

| WO | 2010080547 A1 | 7/2010 |
|---|---|---|
| WO | 2012/153469 A1 | 11/2012 |
| WO | 2014185381 A1 | 11/2014 |

OTHER PUBLICATIONS

Japanese Notification of Rejection dated Apr. 25, 2023 in counterpart Japanese Application JP2022519826, 4 pages in Japanese.
Chinese Notification of Granting of Patent Right Search Report, dated Aug. 24, 2022, in counterpart Chinese application CN201911358618.4, 4pages in Chinese.
Chinese Reexamination Notification, dated Dec. 22, 2021, in counterpart Chinese application 201911358618.4, 7 pages in Chinese.
Evidence 1: "Trace Research on Advanced Automobile Manufacturing Technology 2016," edited by Group of China Society of Automotive Engineering, Beijing Institute of Technology Press, Oct. 2016, 1st edition, pp. 9-10.
Evidence 2: "Import and Export Tax Preferential Policies," edited by the Customs Administration Department of the General Administration of Customs, China Customs Press, Jul. 2015, 1st edition, p. 466.
Evidence 3: Guorong Xu and Haishen Song, "Electrochemical Equipment and Engineering Design," China University of Mining and Technology Press, published on Mar. 31, 2018, pp. 143-144.
Office Action dated Oct. 24, 2023, in corresponding Japanese patent Application No. 2022-519826, 4 pages.

* cited by examiner

ANODE AND METHOD FOR PREPARING THE SAME

CROSS REFERENCE TO THE RELATED APPLICATION

The present application is a National Stage application of PCT international application PCT/CN2019/128441, filed on 25 Dec. 2019, the entire content of which is incorporated herein with reference.

BACKGROUND

1. Technical Field

The present application relates to the field of energy storage, and more particularly to an anode and a preparation method thereof.

2. Description of the Related Art

With the development of technologies and the increasing demands for mobile devices, the demand for electrochemical devices (such as lithium-ion batteries) has increased significantly. An electrochemical device which has high safety and excellent service life is an important research pursuit.

In the preparation process of an anode of an electrochemical device, an anode active material, a dispersing agent, an adhesive, a conductive agent and the like are dissolved into a solvent to form an anode slurry. However, it is generally difficult to uniformly disperse the anode active material, the dispersing agent, the adhesive, the conductive agent and the like, thus causing non-uniformity of the surface tension of the anode slurry. The surface tension difference may cause the phenomena of hole shrinkage, pits or edge shrinkage, thus generating an adverse effect on the appearance of the anode and the performance of the electrochemical device, influencing the safety and the qualification rating of the product, and further increasing production costs.

In view of this, it is indeed necessary to provide an improved anode and a method for preparing the same.

SUMMARY

The embodiments of the present application provide an anode and a method for preparing the same to solve at least one of the problems existing in the related art at least to some extent.

In an aspect of the present application, the present application provides a method for preparing an anode, including the step of adding an auxiliary agent with Si—C and Si—O bonds.

According to some embodiments of the present application, the auxiliary agent with Si—C and Si—O bonds is mixed with a solvent.

According to some embodiments of the present application, the auxiliary agent with Si—C and Si—O bonds is added after the addition of an adhesive.

According to some embodiments of the present application, the method includes the following steps:

S1: a material mixing step, wherein an anode active material, a dispersing agent, an adhesive, a solvent, and the auxiliary agent with Si—C and Si—O bonds are uniformly mixed to obtain an anode slurry;

S2: a coating step, wherein the anode slurry prepared in S1 is coated onto an anode current collector at a coating speed of 10 m/min to 100 m/min to obtain an initial electrode; and S3: a drying step, wherein the initial electrode obtained in S2 is put into a vacuum drying chamber to be dried at a drying temperature of 80° C. to 150° C. to obtain the anode.

According to some embodiments of the present application, the auxiliary agent with Si—C and Si—O bonds has at least one of the following features:

(a) an oxidation potential is not less than 4.5 V, and a reduction potential is not greater than 0.5 V; and (b) a surface tension of a water solution containing 0.1% of the auxiliary agent with Si—C and Si—O bonds is not greater than 30 mN/m.

According to some embodiments of the present application, the auxiliary agent with Si—C and Si—O bonds includes polyether siloxane.

According to some embodiments of the present application, the auxiliary agent with Si—C and Si—O bonds includes at least one of composite silicone polyether complex, polyether modified trisiloxane, or polyether modified organosilicone polyether siloxane.

According to some embodiments of the present application, the anode active material includes at least one of natural graphite, artificial graphite, soft carbon, hard carbon, silica, silicon carbon, silicon alloy or tin alloy.

According to some embodiments of the present application, the solvent is deionized water or N-methylpyrrolidone.

According to some embodiments of the present application, a vibration treatment is performed at the same time in any one step of S1, S2, or S3, wherein the vibration treatment is at least one of mechanical vibration or ultrasonic vibration.

According to some embodiments of the present application, a vibration treatment is performed after any one step of S1, S2, or S3, and the vibration treatment is at least one of mechanical vibration or ultrasonic vibration.

According to some embodiments of the present application, a vibration frequency of the vibration treatment is 100 Hz to 800 Hz, a vibration amplitude is 0.01 mm to 0.5 mm, and a vibration time is 1 min to 5 min.

According to some embodiments of the present application, the vibration treatment is performed for many times, and a vibration frequency of at least one of the vibration treatment is less than a vibration frequency of the previous vibration treatment.

In another aspect of the present application, the present application provides an anode, obtained by the method for preparing an anode according to the present application.

According to some embodiments of the present application, the content of an auxiliary agent with Si—C and Si—O bonds in the anode is below 500 ppm, and is preferably below 300 ppm.

According to some embodiments of the present application, compared with an anode prepared without the addition of the auxiliary agent with Si—C and Si—O bonds, a contact angle of a surface of the anode relative to diethyl carbonate is reduced by more than 10%.

In another aspect of the present application, the present application provides an electrochemical device, including a cathode, an anode, a separator and an electrolyte, wherein the anode is obtained by the method for preparing an anode according to the present application or is the anode of the present application.

In another aspect of the present application, the present application provides an electronic device, including the electrochemical device of the present application.

Additional aspects and advantages of the embodiments of the present application will be partially described or shown in the following description or interpreted by implementing the embodiments of the present application.

BRIEF DESCRIPTION OF THE DRAWINGS

Drawings necessary to describe the embodiments of the present application or the prior art will be briefly illustrated below so as to facilitate the description of the embodiments of the present application. Obviously, the drawings described below are merely partial embodiments of the present application. For those skilled in the art, the drawings of other embodiments can still be obtained according to the structures illustrated in the drawings without any creative effort.

DETAILED DESCRIPTION

The embodiments of the present application will be described in detail below. The embodiments of the present application should not be interpreted as limitations to the present application.

Unless otherwise expressly indicated, the following terms used herein have the meanings indicated below.

In specific implementations and claims, a list of items connected by the term "at least one of" or other similar terms may mean any combination of the listed items. For example, if items A and B are listed, the phrase "at least one of A and B" means only A; only B; or A and B. In another example, if items A, B, and C are listed, the phrase "at least one of A, B, and C" means only A; only B; only C; A and B (excluding C); A and C (excluding B); B and C (excluding A); or A, B, and C. Item A may include a single element or multiple elements. Item B may include a single element or multiple elements. Item C may include a single element or multiple elements. The term "at least one type of" and the term "at least one of" have the same meaning.

Figure 1:
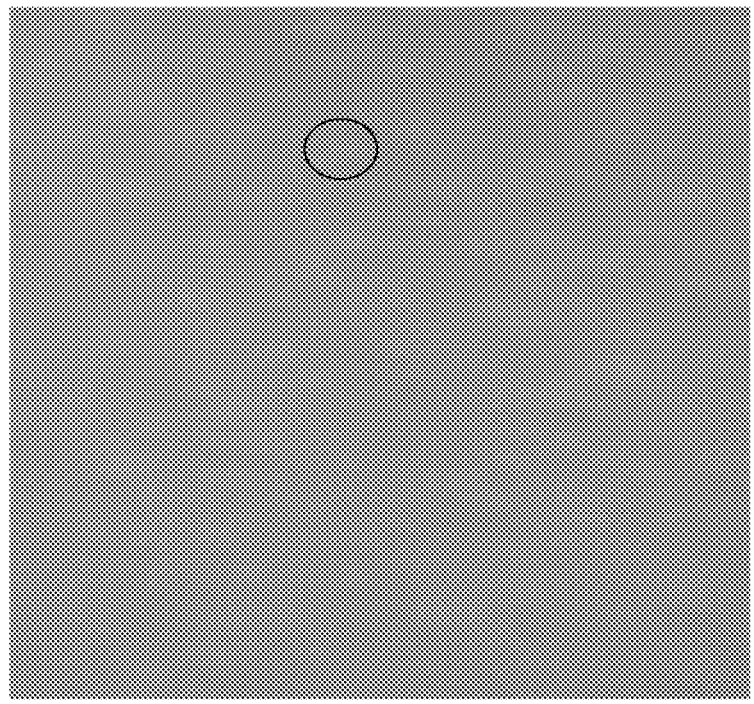
FIG. 1 shows a surface appearance view of the anode of Comparative Example 1.

In the preparation process of an anode, generally, an anode active material, a dispersing agent, an adhesive, a conductive agent and the like are dissolved into a solvent to form an anode slurry, and then the anode slurry is coated onto an anode current collector and subjected to the steps of drying and the like to form the anode. Since the compatibility of the anode active material and the solvent may be relatively poor, the dispersing agent is generally difficult to sufficiently work so that the anode active material, the dispensing agent, the adhesive, the conductive agent and the like are generally not easy to uniformly disperse in the solvent, and thus the anode slurry will not be uniform enough. A non-uniform anode slurry may cause non-uniform surface tension. The surface tension difference may cause the phenomena of hole shrinkage, pits or edge shrinkage (as shown in FIG. 1), which generates an adverse effect on the appearance of the anode and the performance of an electrochemical device, influences the safety and the qualification rating of the product, and further increases production costs.

Figure 2:
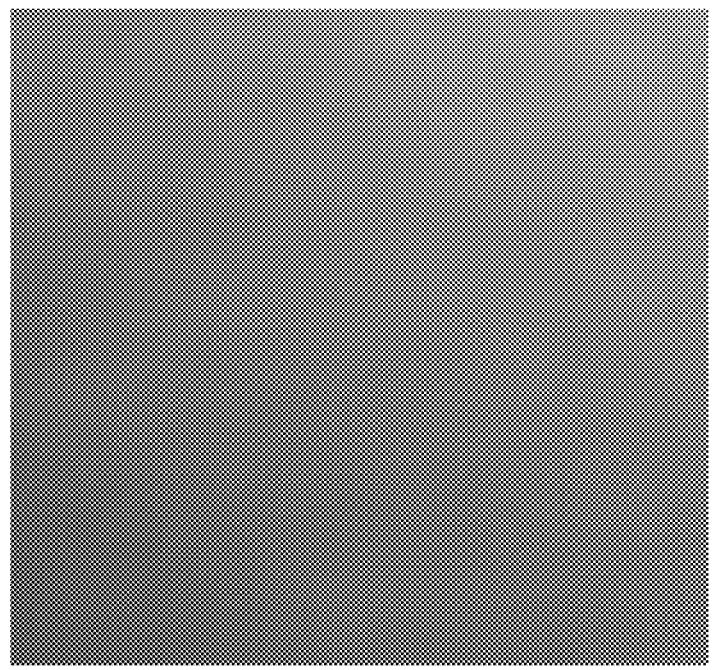
FIG. 2 shows a surface appearance view of the anode of Example 2.

The present application improves the compatibility between the anode active material and the solvent using a specific preparation method, further improves the surface tension of the anode slurry, and reduces the phenomena of hole shrinkage, pits or edge shrinkage on a surface of the anode (as shown in FIG. 2), thereby improving the quality of the anode and improving the performance of the electrochemical device.

1. Method for Preparing Anode

In one embodiment, the present application provides a method for preparing an anode, including the step of adding an auxiliary agent with Si—C and Si—O bonds.

According to some embodiments of the present application, the method includes the following steps:

S1: Material Mixing Step

In this step, an anode active material, a dispersing agent, an adhesive, a solvent, and the auxiliary agent with Si—C and Si—O bonds are uniformly mixed to obtain an anode slurry.

According to some embodiments of the present application, the auxiliary agent with Si—C and Si—O bonds is mixed with the solvent.

According to some embodiments of the present application, the auxiliary agent with Si—C and Si—O bonds is added after the addition of an adhesive.

According to some embodiments of the present application, the anode active material includes at least one of natural graphite, artificial graphite, soft carbon, hard carbon, silica, silicon carbon, silicon alloy, or tin alloy.

According to some embodiments of the present application, the solvent is deionized water or N-methylpyrrolidone.

According to some embodiments of the present application, the dispersing agent includes at least one of carboxymethyl cellulose, a carboxymethyl cellulose derivative, alginic acid, an alginic acid derivative, polyacrylic acid, a polyacrylic acid derivative, polyamide acid, a polyamide acid derivative, polyvinyl alcohol, a polyvinyl alcohol derivative, starch, a starch derivative, hydroxypropyl cellulose or a hydroxypropyl cellulose derivative.

According to some embodiments of the present application, the adhesive includes at least one of styrene butadiene rubber, polyacrylic ester, polytetrafluoroethylene, polyvinyl alcohol, polyurethane, polyvinylidene fluoride, a vinylidene fluoride-tetrafluoroethylene copolymer, a vinylidene fluoride-hexafluoropropylene copolymer, a hexafluoropropylene-tetrafluoroethylene copolymer, or a vinylidene fluoride-tetrafluoroethylene-hexafluoropropylene copolymer.

According to some embodiments of the present application, the auxiliary agent with Si—C and Si—O bonds has at least one of the following features:

(c) an oxidation potential is not less than 4.5 V, and a reduction potential is not greater than 0.5 V; and (d) a surface tension of a water solution containing 0.1% of the auxiliary agent with Si—C and Si—O bonds is not greater than 30 mN/m.

In some embodiments, the oxidation potential of the auxiliary agent with Si—C and Si—O bonds is not less than 4.5 V, and the reduction potential is not greater than 0.5 V. In some embodiments, the oxidation potential of the auxiliary agent with Si—C and Si—O bonds is not less than 5 V, and the reduction potential is not greater than 0.3 V. The electrochemical performance of the auxiliary agent with the above oxidation/reduction potential is stable, and is beneficial for the improvement of cycle and high-temperature storage performance of the electrochemical device.

In some embodiments, the surface tension of the water solution containing 0.1 wt % of the auxiliary agent with Si—C and Si—O bonds is not greater than 30 mN/m. In some embodiments, the surface tension of the water solution containing 0.1 wt % of the auxiliary agent with Si—C and Si—O bonds is not greater than 25 mN/m. In some embodiments, the surface tension of the water solution containing 0.1 wt % of the auxiliary agent with Si—C and Si—O bonds is not greater than 20 mN/m. In some embodiments, the surface tension of the water solution containing 0.1 wt % of the auxiliary agent with Si—C and Si—O bonds is not greater than 15 mN/m. In some embodiments, the surface tension of the water solution containing 0.1 wt % of the auxiliary agent with Si—C and Si—O bonds is not greater than 10 mN/m. When the surface tension of the water solution containing the auxiliary agent with Si—C and Si—O bonds is within the above range, the interface of the anode mixture layer is good.

The surface tension of the water solution containing the auxiliary agent with Si—C and Si—O bonds may be determined by the following method: a JC2000D3E contact angle measuring instrument is used to test an auxiliary agent water solution with the solid content of 0.1%, each sample is tested at least 3 times, at least 3 data samples are selected, and an average value is taken to obtain the surface tension of the water solution containing the auxiliary agent.

According to some embodiments of the present application, the auxiliary agent with Si—C and Si—O bonds includes polyether siloxane.

According to some embodiments of the present application, the auxiliary agent with Si—C and Si—O bonds includes at least one of a composite silicone polyether complex, polyether modified trisiloxane, or polyether modified organosilicone polyether siloxane.

According to some embodiments of the present application, the addition amount of the auxiliary agent with Si—C and Si—O bonds is below 3000 ppm. In some embodiments, the addition amount of the auxiliary agent with Si—C and Si—O bonds is below 2500 ppm. In some embodiments, the addition amount of the auxiliary agent with Si—C and Si—O bonds is below 2000 ppm. In some embodiments, the addition amount of the auxiliary agent with Si—C and Si—O bonds is below 1500 ppm. In some embodiments, the addition amount of the auxiliary agent with Si—C and Si—O bonds is below 1000 ppm. In some embodiments, the addition amount of the auxiliary agent with Si—C and Si—O bonds is below 500 ppm. When the addition amount of the auxiliary agent with Si—C and Si—O bonds is within the above range, the surface tension of the anode slurry can be effectively reduced.

The proportion of the anode active material, the dispersing agent, the adhesive, the solvent and the auxiliary agent with Si—C and Si—O bonds added in this step is not particularly limited as long as it is a known proportion which can be used in the preparation process of the anode slurry.

S2: Coating Step

In this step, the anode slurry prepared in S1 is coated onto an anode current collector at a coating speed of 10 m/min to 100 m/min to obtain an initial electrode.

S3: Drying Step

In this step, the initial electrode obtained in S2 is put into a vacuum drying chamber to be dried at a drying temperature of 80° C. to 150° C. to obtain the anode.

According to some embodiments of the present application, a vibration treatment is performed at the same time in any one step of S1, S2, or S3, and the vibration treatment is at least one of mechanical vibration or ultrasonic vibration. According to some embodiments of the present application, a vibration treatment is performed after any one step of S1, S2, or S3, and the vibration treatment is at least one of mechanical vibration or ultrasonic vibration. The vibration treatment can effectively prevent non-uniformity of the anode slurry due to density differences.

According to some embodiments of the present application, a vibration frequency of the vibration treatment is 100 Hz to 800 Hz, a vibration amplitude is 0.01 mm to 0.5 mm, and a vibration time is 1 min to 5 min.

According to some embodiments of the present application, the vibration treatment is performed many times, and a vibration frequency of at least one of the vibration treatment is less than a vibration frequency of the previous vibration treatment.

2. Anode

In another embodiment, the present application provides an anode, obtained by the method for preparing an anode according to the present application.

According to some embodiments of the present application, the content of the auxiliary agent with Si—C and Si—O bonds in the anode is below 500 ppm. In some embodiments, the content of the auxiliary agent with Si—C and Si—O bonds in the anode is below 400 ppm. In some embodiments, the content of the auxiliary agent with Si—C and Si—O bonds in the anode is below 300 ppm. In some embodiments, the content of the auxiliary agent with Si—C and Si—O bonds in the anode is below 200 ppm.

According to some embodiments of the present application, compared with an anode (a contact angle is greater than 70°) prepared without the addition of the auxiliary agent with Si—C and Si—O bonds, the anode realizes more than a 10% reduction of a contact angle of a surface relative to diethyl carbonate.

The contact angle refers to a contact angle measured within 10 seconds after diethyl carbonate liquid drops are dripped on an anode mixture layer. Diethyl carbonate is a common electrolyte solvent. By using diethyl carbonate as a test index of the contact angle, the wetting performance of the electrolyte for entering the anode mixture layer can be detected. The reduction of the contact angle of the surface of the anode relative to the diethyl carbonate may show an improvement of the wetting performance of the electrolyte for entering the anode mixture layer, and an enhancement of the liquid retention performance of the anode mixture layer.

The contact angle may be measured by an automatic contact angle measuring meter prepared by Kyowa Interface Science Co., Ltd., etc. The contact angle $\theta$ may be determined by, for example, a $\theta/2$ method, that is, under the condition of limiting an angle between a base line of the liquid drops and a line exceeding the top point of the liquid drops to be $\theta'$, wherein the contact angle $\theta=2\theta'$ is established. According to this content, the contact angle $\theta$ may be calculated by measuring $\theta'$ by using the distance 2r of the base line of the liquid drops and the height h of the liquid drops. At this time, it is necessary to enable the liquid drops to be dripped at a certain quantity to reach a degree of avoiding gravity influence. A non-aqueous solvent used for a contact angle test may be selected from a common electrolyte solvent such as diethyl carbonate, methyl ethyl carbonate, dimethyl carbonate, methyl propyl carbonate or methyl isopropyl carbonate.

According to some embodiments of the present application, a contact angle of an anode active material layer relative to the non-aqueous solvent is not greater than 60°. In some embodiments, through determination by a contact angle determination method, the contact angle of the anode active material layer relative to the non-aqueous solvent is not greater than 50°. In some embodiments, through determination by the contact angle determination method, the contact angle of the anode active material layer relative to the non-aqueous solvent is not greater than 30°. When the anode active material layer has the above contact angle relative to the non-aqueous solvent, the interface of the anode active material layer has fewer defects, stability of the electrochemical device in a charge and discharge cycle is good, and the cycle performance of the electrochemical device can be ensured.

3. Cathode

The cathode, separator and electrolyte are not particularly limited, and may be a known cathode, separator and electrolyte which can be used for an electrochemical device (such as a lithium-ion battery).

The cathode which can be used for the embodiments of the present application includes a cathode current collector and a cathode active material layer positioned on the cathode current collector. The type of cathode active materials is not particularly limited, and may be a known type of cathode active materials which can be used for an electrochemical device (such as the lithium-ion battery), such as a lithium-containing compound, which can provide high-energy density for the electrochemical device. The lithium-containing compound includes one or more of a lithium transition metal composite oxide and a lithium transition metal phosphate compound. The lithium transition metal composite oxide includes lithium and an oxide having one or more transition metal elements. The lithium transition metal phosphate compound is a phosphate compound including lithium and having one or more transition metal elements. The transition metal elements include one or more of Co, Ni, Mn, and Fe. These elements enable the electrochemical device to obtain a higher voltage. The lithium-containing compound has a chemical formula of $Li_xM1O_2$ or $Li_yM2PO_4$, wherein M1 and M2 represent one or more transition metal elements; values of x and y change along with a charge/discharge state, and are generally in the following ranges: $0.05 \leq x \leq 1.10$ and $0.05 \leq y \leq 1.10$. In some embodiments, the lithium transition metal composite oxide includes, but is not limited to, $LiCoO_2$, $LiNiO_2$, and a lithium and nickel-based transition metal composite oxide represented by the formula of $LiNi_{1-z}MzO_2$, wherein M is one or more selected from Co, Mn, Fe, Al, V, Sn, Mg, Ti, Sr, Ca, Zr, Mo, Tc, Ru, Ta, W, Re, Yb, Cu, Zn, Ba, B, Cr, Si, Ga, P, Sb, and Nb, and z meets $0.005<z<0.5$. In some embodiments, the lithium transition metal phosphate compound includes, but is not limited to, $LiFePO_4$ and a compound represented by the formula of $LiFe_{1-u}Mn_uPO_4$, wherein $u<1$. By using these compounds as the cathode active material, the obtained electrochemical device has high battery capacity and excellent cycle performance.

4. Electrolyte

The type of the electrolyte is not particularly limited, and may be a known type of electrolyte which can be used for the electrochemical device (such as the lithium-ion battery).

The electrolyte includes any known non-aqueous solvent which can be used as a solvent of the electrolyte in the prior art. The non-aqueous solvent includes, but is not limited to, one or more of cyclic carbonate, chain carbonate, cyclic carboxylate, chain carboxylate, cyclic ether, chain ether, a phosphorus-containing organic solvent, a sulfur-containing organic solvent, and an aromatic fluorine-containing solvent.

An example of the cyclic carbonate may include, but is not limited to, one or more of the following: ethylene carbonate (EC), propylene carbonate (PC) and butylene carbonate. In some embodiments, the cyclic carbonate has 3 to 6 carbon atoms.

An example of the chain carbonate may include, but is not limited to, one or more of the following: dimethyl carbonate, methyl ethyl carbonate, diethyl carbonate (DEC), methyl n-propyl carbonate, ethyl n-propyl carbonate, dipropyl carbonate and other chain carbonates. An example of the fluorine-substituted chain carbonate may include, but is not limited to, one or more of the following: bis(fluoromethyl) carbonate, bis(difluoromethyl)carbonate, bis(trifluoromethyl)carbonate, bis(2-fluoroethyl)carbonate, bis(2,2-difluoroethyl)carbonate, bis(2,2,2-trifluoroethyl)carbonate, 2-fluoroethyl methyl carbonate, 2,2-difluoroethyl methyl carbonate, and 2,2,2-trifluoroethyl methyl carbonate.

An example of the cyclic carboxylate may include, but is not limited to, one or more of the following: γ-butyrolactone and γ-valerolactone. In some embodiments, partial hydrogen atoms of the cyclic carboxylate may be substituted with fluorine.

An example of the chain carboxylate may include, but is not limited to, one or more of the following: methyl acetate, ethyl acetate, propyl acetate, isopropyl acetate, butyl acetate, sec-butyl acetate, isobutyl acetate, tert-butyl acetate, methyl propionate, ethyl propionate, propyl propionate, isopropyl propionate, methyl butyrate, ethyl butyrate, propyl butyrate, methyl isobutyrate, ethyl isobutyrate, methyl valerate, ethyl valerate, methyl pivalate, and ethyl pivalate. In some embodiments, partial hydrogen atoms of the chain carboxylate may be substituted with fluorine. In some embodiments, an example of the fluorine-substituted chain carboxylate may include, but is not limited to, methyl trifluoroacetate, ethyl trifluoroacetate, propyl trifluoroacetate, butyl trifluoroacetate, and 2,2,2-trifluoroethyl trifluoroacetate.

An example of the cyclic ether may include, but is not limited to, one or more of the following: tetrahydrofuran, 2-methyltetrahydrofuran, 1,3-dioxolane, 2-methyl-1,3-dioxolane, 4-methyl-1,3-dioxolane, 1,3-dioxane, 1,4-dioxane, and dimethoxypropane.

An example of the chain ether may include, but is not limited to, one or more of the following: dimethoxymethane, 1,1-dimethoxyethane, 1,2-dimethoxyethane, diethoxymethane, 1,1-diethoxyethane, 1,2-diethoxyethane, ethoxy methoxymethane, 1,1-ethoxy methoxyethane, and 1,2-ethoxy methoxyethane An example of the phosphorus-containing organic solvent may include, but is not limited to, one or more of the following: trimethyl phosphate, triethyl phosphate, dimethyl ethyl phosphonate, methyl diethyl phosphonate, ethidene methyl phosphonate, ethidene ethyl phosphonate, triphenyl phosphate, trimethyl phosphite, triethyl phosphite, triphenyl phosphite, tris(2,2,2-trifluoroethyl)phosphate, and tris(2,2,3,3,3-pentafluoropropyl)phosphate.

An example of the sulfur-containing organic solvent may include, but is not limited to, one or more of the following: sulfolane, 2-methylsulfolane, 3-methylsulfolane, dimethyl sulfone, diethyl sulfone, ethyl methyl sulfone, methyl propyl sulfone, dimethyl sulfoxide, methyl methanesulfonate, ethyl methanesulfonate, methyl ethanesulfonate, ethyl ethanesulfonate, dimethyl sulfate, diethyl sulfate, and dibutyl sulfate. In some embodiments, partial hydrogen atoms of the sulfur-containing organic solvent may be substituted with fluorine.

The aromatic fluorine-containing solvent may include, but is not limited to, one or more of the following: fluorobenzene, difluorobenzene, trifluorobenzene, tetrafluorobenzene, pentafluorobenzene, hexafluorobenzene, and trifluoromethylbenzene.

In some embodiments, the solvent used in the electrolyte of the present application includes at least one of cyclic carbonate, chain carbonate, cyclic carboxylate or chain carboxylate. In some embodiments, the solvent used in the electrolyte of the present application includes at least one of ethylene carbonate, propylene carbonate, diethyl carbonate, ethyl propionate, propyl propionate, n-propyl acetate, or ethyl acetate. In some embodiments, the solvent used in the electrolyte of the present application includes at least one of ethylene carbonate, propylene carbonate, diethyl carbonate, ethyl propionate, propyl propionate, or γ-butyrolactone.

An electrolyte which can be used in the electrolyte of the embodiments of the present application includes, but is not limited to, an inorganic lithium salt, such as $LiClO_4$, $LiAsF_6$, $LiPF_6$, $LiBF_4$, $LiSbF_6$, $LiSO_3F$, and $LiN(FSO_2)_2$; a fluorine-containing organic lithium salt, such as $LiCF_3SO_3$, $LiN(FSO_2)(CF_3SO_2)$, $LiN(CF_3SO_2)_2$, $LiN(C_2F_5SO_2)_2$, lithium cyclic 1,3-hexafluoropropane disulfonimide, lithium cyclic 1,2-tetrafluoroethane disulfonimide, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_2(CF_3)_2$, $LiBF_2(C_2F—)_2$, $LiBF_2(CF_3SO_2)_2$, and $LiBF_2(C_2F_5SO_2)_2$; and a dicarboxylate-complex-containing lithium salt, such as lithium bis(oxalato)borate, lithium difluorooxalatoborate, lithium tri(oxalato)borate, lithium difluoro bis(oxalato)borate, and lithium tetrafluoro(oxalato)borate. Additionally, the above electrolytes may be used singly or in combination of two or more at the same time. For example, in some embodiments, the electrolyte includes a combination of $LiPF_6$ and $LiBF_4$. In some embodiments, the electrolyte includes a combination of an inorganic lithium salt, such as $LiPF_6$ or $LiBF_4$, and a fluorine-containing organic lithium salt such as $LiCF_3SO_3$, $LiN(CF_3SO_2)_2$, and $LiN(C_2F_5SO_2)_2$. In some embodiments, the concentration of the electrolyte is in a range of 0.8 to 3 mol/L, for example, a range of 0.8 to 2.5 mol/L, a range of 0.8 to 2 mol/L, a range of 1 to 2 mol/L, and for another example, 1 mol/L, 1.15 mol/L, 1.2 mol/L, 1.5 mol/L, 2 mol/L or 2.5 mol/L.

5. Separator

The type of separator is not particularly limited, and may be a known type of separator which can be used for the electrochemical device (such as the lithium-ion battery).

The separator which can be used for the embodiments of the present application includes a polymer or an inorganic material or the like formed by a material stable in the electrolyte of the present application. For example, the separator may include a substrate layer and a surface treatment layer. The substrate layer is a non-woven fabric, film, or composite film having a porous structure, and the material of the substrate layer includes at least one of polyethylene, polypropylene, polyethylene terephthalate, and polyimide. Specifically, a porous polypropylene film, a porous polyethylene film, a polypropylene nonwoven fabric, a polyethylene nonwoven fabric, or a porous polypropylene-polyethylene-polypropylene composite film may be selected and used.

The surface treatment layer is disposed on at least one surface of the substrate layer, may be a polymer layer or an inorganic material layer, or may be a layer formed by mixing a polymer and an inorganic material.

The inorganic material layer includes inorganic particles and an adhesive. The inorganic particles include one or a combination of several of aluminum oxide, silicon oxide, magnesium oxide, titanium oxide, hafnium dioxide, tin oxide, cerium dioxide, nickel oxide, zinc oxide, calcium oxide, zirconium oxide, yttrium oxide, silicon carbide, boehmite, aluminum hydroxide, magnesium hydroxide, calcium hydroxide, or barium sulfate. The adhesive includes one or a combination of several of polyvinylidene fluoride, a vinylidene fluoride-hexafluoropropylene copolymer, polyamide, polyacrylonitrile, polyacrylic ester, polyacrylic acid, polyacrylate, polyvinylpyrrolidone, polyvinyl ether, polymethyl methacrylate, polytetrafluoroethylene, or polyhexafluoropropylene.

The polymer layer includes a polymer, and the material of the polymer includes at least one of polyamide, polyacrylonitrile, an acrylate polymer, polyacrylic acid, polyacrylate, polyvinylpyrrolidone, polyvinyl ether, polyvinylidene fluoride, or poly(vinylidene fluoride-hexafluoropropylene).

6. Electrochemical Device

The electrochemical device of the present application includes any device undergoing an electrochemical reaction, and specific examples of the electrochemical device include all types of primary batteries, secondary batteries, fuel batteries, solar batteries, or capacitors. Particularly, the electrochemical device is a lithium secondary battery including a lithium metal secondary battery, a lithium-ion secondary battery, a lithium polymer secondary battery, or a lithium-ion polymer secondary battery. In some embodiments, the electrochemical device of the present application includes a cathode with a cathode active material capable of occluding and releasing metal ions; an anode according to the embodiments of the present application; an electrolyte; and a separator disposed between the cathode and the anode.

7. Electronic Device

The purpose of the electrochemical device of the present application is not particularly limited, and the electrochemical device may be used for any electronic device known in the prior art. In one embodiment, the electrochemical device of the present application can be used for, but is not limited to, notebook computers, pen input computers, mobile computers, e-book players, portable telephones, portable fax machines, portable copy machines, portable printers, headset stereo headphones, video recorders, LCD TVs, portable cleaners, portable CD players, minidisc players, transceivers, electronic notebooks, calculators, memory cards, portable recorders, radios, backup power supplies, motors, cars, motorcycles, power bicycles, bicycles, lighting fixtures, toys, game consoles, clocks, electric tools, flashlights, cameras, large household storage batteries, lithium-ion capacitors, etc.

The lithium-ion battery is taken as an example below to illustrate the preparation of the lithium-ion battery in conjunction with specific embodiments. It should be understood by those skilled in the art that the preparation method described in the present application is merely an example, and any other suitable preparation methods fall within the scope of the present application.

EXAMPLES

Implementations of the present application will be described in detail below in conjunction with examples and comparative examples. However, implementations of the present application are not limited to these examples only.

I. Preparation of Lithium-Ion Battery

1. Preparation of Anode

S1: Material Mixing Step

Artificial graphite, styrene butadiene rubber and carboxymethyl cellulose in a mass proportion of 96%:3%:1% were mixed with deionized water in accordance with an adding sequence:
1. artificial graphite and carboxymethyl cellulose
2. deionized water
3. carboxymethyl cellulose
4. styrene butadiene rubber 2000 ppm of an auxiliary agent with Si—C and Si—O bonds was added according to the following examples, no auxiliary agent was added into the comparative examples or 2000 ppm of an auxiliary agent without Si—C and Si—O bonds was added into the comparative examples. The auxiliary agents with Si—C and Si—O bonds used in the examples of the present application are shown in the following table:

| Auxiliary agent | Name (Trade name) |
| --- | --- |
| Auxiliary agent 1 | Trisiloxane surfactant (CAS No. 3390-61-2; 28855-11-0) |
| Auxiliary agent 2 | Organosilicon surfactant (Sylgard 309) |
| Auxiliary agent 3 | Dihydroxyl polydimethylsiloxane (PMX-0156) |
| Auxiliary agent 4 | N-β-aminoethyl-Y-aminopropyl dimethoxymethyl silane (KH-602) |
| Auxiliary agent 5 | Methylsilicone oil polydimethylsiloxane (CAS No. 63148-62-9) |

All ingredients were uniformly mixed to obtain an anode slurry.

S2: Coating step. The anode slurry prepared in S1 was coated onto a 12 μm copper foil at a coating speed of 10 m/min to 100 m/min to obtain an initial electrode.

S3: Drying Step

The initial electrode obtained in S2 was put into a vacuum drying chamber to be dried at a drying temperature of 80° C. to 150° C. to obtain an anode.

2. Preparation of Cathode

Lithium cobalt oxide ($LiCoO_2$), a conductive material (Super-P) and polyvinylidene fluoride (PVDF) in a mass proportion of 95%:2%:3% were mixed with N-methylpyrrolidone and uniformly stirred to obtain a cathode slurry. The cathode slurry was coated onto a 12 μm aluminum foil and then dried, cold pressed, plate cut, and tab welded to obtain a cathode.

3. Preparation of Electrolyte

In a dry argon gas environment, EC, PC, and DEC were mixed (according to a weight proportion of 1:1:1), and $LiPF_6$ was added to obtain an electrolyte through uniform mixing. The concentration of the $LiPF_6$ was 1.15 mol/L.

4. Preparation of Separator

A porous polyethylene (PE) polymer film was used as a separator.

5. Preparation of Lithium-Ion Battery

The obtained cathode, separator, and anode were sequentially wound, and put into an outer packaging foil, and a liquid injection opening was left. The electrolyte was filled into the liquid injection opening. After packaging and the work procedures of formation, capacity, etc., a lithium-ion battery was prepared.

II. Method for Testing Surface Defect of Anode of Lithium-Ion Battery

A CCD scanner was used to perform scanning and photo-taking of an electrode subjected to cold pressing. Gray level differences in different positions were used to recognize defects. The condition of the 0.2 $mm^2$ area and the gray level difference greater than 10 was regarded as an electrode defect. The number of defects was counted.

III. Test Results

Table 1 shows the influence of the auxiliary agents and the adding sequence thereof on the surface defects of the anode of the lithium-ion battery.

TABLE 1

| | Auxiliary agents and adding sequence thereof | Number of surface defects of anode/10 $m^2$ |
| --- | --- | --- |
| Comparative Example 1 | No auxiliary agent was added | 20 |
| Example 1 | Auxiliary agent 1 was mixed with carboxymethyl cellulose in sequence 1 | 10 |
| Example 2 | Auxiliary agent 1 was mixed with deionized water in sequence 2 | 1 |
| Example 3 | Auxiliary agent 1 was added between sequence 3 and sequence 4 | 11 |
| Example 4 | Auxiliary agent 1 was mixed with an adhesive in sequence 4 | 2 |
| Example 5 | Auxiliary agent 1 was added after sequence 4 | 1 |

As shown in Comparative Example 1, no auxiliary agent was added during the preparation of the anode, and the number of the surface defects of the obtained anode was great. As shown in Examples 1 to 5, the auxiliary agent with Si—C and Si—O bonds was added during the preparation of the anode, and the surface tension of the anode slurry was obviously improved, thus clearly reducing the number of surface defects on the anode. The auxiliary agent was added during the preparation of the anode, the auxiliary agent with Si—C and Si—O bonds was mixed with a solvent, and the auxiliary agent with Si—C and Si—O bonds was mixed with an adhesive, or the auxiliary agent with Si—C and Si—O bonds was added after the addition of the adhesive, and the number of surface defects on the anode was very small. FIG. 1 and FIG. 2 are electrodes respectively prepared according to Comparative Example 1 and Example 2. A position with an obvious color difference in FIG. 1 (for example, a position marked by a black circle in FIG. 1) is a defect position of the electrode. In FIG. 2, color difference spots are hardly seen.

Table 2 shows the influence of different auxiliary agents on the surface defects of the anode of the lithium-ion battery. In the example in Table 2, each auxiliary agent was mixed with deionized water in sequence 2.

TABLE 2

| | Auxiliary agent | Number of surface defects of anode/10 $m^2$ |
| --- | --- | --- |
| Comparative Example 2 | Ethanol | 18 |
| Comparative Example 3 | Acetone | 16 |
| Comparative Example 4 | Ethylene carbonate | 15 |
| Example 2 | Auxiliary agent 1 | 1 |
| Example 6 | Auxiliary agent 2 | 1.2 |
| Example 7 | Auxiliary agent 3 | 1.1 |
| Example 8 | Auxiliary agent 4 | 0.9 |
| Example 9 | Auxiliary agent 5 | 0.8 |

As shown in Comparative Examples 2 to 4, a common organic solvent (such as ethanol, acetone, or ethylene carbonate without Si—C and Si—O bonds) was added as the auxiliary agent during the preparation of the anode, and the number of surface defects on the anode was not significantly reduced. As shown in Examples 2 and 6 to 9, the auxiliary agents with Si—C and Si—O bonds were added during the preparation of the anode, and the surface tension of the anode slurry was significantly reduced, and the number of surface defects on the anode was significantly reduced.

Table 3 shows the influence of the coating speed, the drying temperature and vibration treatment on surface defects on the anode of the lithium-ion battery. In the examples in Table 3, Auxiliary agent 1 was mixed with deionized water in sequence 2. The vibration treatment was an ultrasonic treatment performed after step S2.

TABLE 3

| | Coating speed (m/min) | Drying temperature (° C.) | Vibration treatment | Number of surface defects of anode/10 m$^2$ |
|---|---|---|---|---|
| Example 10 | 5 | 70 | No | 4 |
| Example 11 | 10 | 80 | No | 5 |
| Example 12 | 110 | 100 | No | 6 |
| Example 2 | 20 | 120 | No | 1 |
| Example 13 | 50 | 130 | No | 0.8 |
| Example 14 | 80 | 130 | No | 0.5 |
| Example 15 | 100 | 150 | No | 0.7 |
| Example 16 | 100 | 160 | No | 3 |
| Example 17 | 50 | 130 | Yes | 0.3 |
| Example 18 | 80 | 130 | Yes | 0.2 |

The results show that when the coating speed is 10 m/min to 100 m/min, and the drying temperature was 80° C. to 150° C., the number of surface defects on the anode was further reduced. When the coating speed was 20 m/min to 100 m/min, and the drying temperature was 80° C. to 150° C., the number of surface defects on the anode was further reduced. Particularly, after the addition of the vibration treatment, a better effect was obtained.

References throughout the specification to "embodiments", "partial embodiments", "one embodiment", "another example", "example", "specific example" or "partial examples" mean that at least one embodiment or example of the present application includes specific features, structures, materials or characteristics described in the embodiments or examples. Therefore, descriptions appearing throughout the specification, such as "in some embodiments", "in the embodiments", "in one embodiment", "in another example", "in one example", "in a particular example" or "examples", are not necessarily references to the same embodiment or example in the present application. Furthermore, the specific features, structures, materials or characteristics in the descriptions can be combined in any suitable manner in one or more embodiments or examples.

While the illustrative embodiments have been shown and described, it will be understood by those skilled in the art that the embodiments are not to be construed as limiting the present application, and modifications, substitutions and changes can be made to the embodiments without departing from the spirit, principle and scope of the present application.

What is claimed is:

1. A method for preparing an anode, comprising a step of S1: a material mixing step, uniformly mixing an anode active material, a dispersing agent, an adhesive, a solvent, and an auxiliary agent with Si—C and Si—O bonds to obtain an anode slurry,
wherein the anode active material, the dispersing sent, the adhesive, the solvent, and the auxiliary agent with Si—C and Si—O bonds are added in following sequence:
(1) the anode active material and the dispersing agent,
(2) the solvent,
(3) the dispersing agent, and
(4) the adhesive,
wherein the auxiliary agent with Si—C and Si—O bonds is added in the sequence (2) by mixing along with the solvent, or the auxiliary agent is added in sequence (4) by mixing along with the adhesive, or the auxiliary agent is added after the sequence (4).

2. The method for preparing an anode according to claim 1, wherein the auxiliary agent with Si—C and Si—O bonds is mixed along with the solvent in the sequence (2).

3. The method for preparing an anode according to claim 1, wherein the auxiliary agent with Si—C and Si—O bonds is added after the addition of the adhesive.

4. The method for preparing an anode according to claim 1, further comprising the following steps: S2: a coating step, wherein the anode slurry prepared in S1 is coated onto an anode current collector at a coating speed of 10 m/min to 100 m/min to obtain an initial electrode; and S3: a drying step, wherein the initial electrode obtained in S2 is put into a vacuum drying chamber to be dried at a drying temperature of 80° C. to 150° C. to obtain the anode.

5. The method for preparing an anode according to claim 1, wherein the auxiliary agent with Si—C and Si—O bonds has at least one of the following features: (a) an oxidation potential is not less than 4.5 V, and a reduction potential is not greater than 0.5 V; and (b) a surface tension of a water solution containing 0.1% of the auxiliary agent with Si—C and Si—O bonds is not greater than 30 mN/m.

6. The method for preparing an anode according to claim 1, wherein the auxiliary agent with Si—C and Si—O bonds comprises polyether siloxane.

7. The method for preparing an anode according to claim 1, wherein the addition amount of the auxiliary agent with Si—C and Si—O bonds is below 3000 ppm.

8. The method for preparing an anode according to claim 4, wherein the anode active material comprises at least one of natural graphite, artificial graphite, soft carbon, hard carbon, silica, silicon carbon, silicon alloy, or tin alloy.

9. The method for preparing an anode according to claim 2, wherein the solvent is deionized water or N-methylpyrrolidone.

10. The method for preparing an anode according to claim 4, wherein a vibration treatment is performed at the same time in any one step of S1, S2, or S3, and the vibration treatment is at least one of mechanical vibration or ultrasonic vibration.

11. The method for preparing an anode according to claim 4, wherein a vibration treatment is performed after any one step of SI, S2, or S3, and the vibration is at least one of mechanical vibration or ultrasonic vibration.

12. The method for preparing an anode according to claim 10, wherein a vibration frequency of the vibration treatment is 100 Hz to 80 Hz, a vibration amplitude is 0.01 mm to 0.5 mm, and a vibration time is 1 min to 5 min.

13. The method for preparing an anode according to claim 10, wherein the vibration treatment is performed at least two times, and a vibration frequency of at least one of the at least two times of the vibration treatment is less than a vibration frequency of the previous vibration treatment among the at least two times of the vibration treatment.

14. An anode, obtained by a method for preparing the anode comprising a step of S1: a material mixing step, wherein an anode active material, a dispersing agent, an adhesive, a solvent, and an auxiliary agent with Si—C and Si—O bonds are uniformly mixed to obtain an anode slurry,
wherein the auxiliary agent with Si—C and Si—O bonds is added after an addition of the adhesive.

15. The anode according to claim 14, wherein compared with an anode prepared without the addition of an auxiliary agent with Si—C and Si—O bonds, a contact angle of a surface of the anode relative to diethyl carbonate is reduced by more than 10%.

16. An electrochemical device, comprising a cathode, an anode, a separator and an electrolyte, wherein the anode is obtained by the method for preparing an anode, comprising a step of S1: a material mixing step, wherein an anode active material, a dispersing agent, an adhesive, a solvent, and an auxiliary agent with Si—C and Si—O bonds are uniformly mixed to obtain an anode slurry, wherein the auxiliary agent with Si—C and Si—O bonds is added after an addition of the adhesive.

17. An electronic device, comprising the electrochemical device according to claim 16.

18. The anode according to claim 14, wherein the content of the auxiliary agent with Si—C and Si—O bonds in the anode is below 300 ppm.

19. The anode according to claim 14, wherein the anode comprises an anode active material layer, and a contact angle of the anode active material layer relative to an non-aqueous solvent is not greater than 60°.

20. The method for preparing an anode according to claim 1, wherein, the adhesive comprises at least one selected from the group consisting of styrene butadiene rubber, polyacrylic ester, polytetrafluoroethylene, polyvinyl alcohol, polyurethane, polyvinylidene fluoride, a vinylidene fluoride-tetrafluoroethylene copolymer, a vinylidene fluoride-hexafluoropropylene copolymer, a hexafluoropropylene-tetrafluoroethylene copolymer, and a vinylidene fluoride-tetrafluoroethylene-hexafluoropropylene copolymer; and the dispersing agent comprises at least one selected from the group consisting of carboxymethyl cellulose, a carboxymethyl cellulose derivative, alginic acid, an alginic acid derivative, polyacrylic acid, a polyacrylic acid derivative, polyamide acid, a polyamide acid derivative, polyvinyl alcohol, a polyvinyl alcohol derivative, starch, a starch derivative, hydroxypropyl cellulose or a hydroxypropyl cellulose derivative.

21. The method for preparing an anode according to claim 1, wherein, the anode active material is artificial graphite; the dispersing agent is carboxymethyl cellulose; the adhesive is styrene butadiene rubber; the solvent is deionized water; and the auxiliary agent with Si—C and Si—O bonds is trisiloxane.

* * * * *